US010805039B2

(12) United States Patent
Sun et al.

(10) Patent No.: US 10,805,039 B2
(45) Date of Patent: Oct. 13, 2020

(54) RATE MATCHING BEHAVIOR FOR BUNDLED CORESETS

(71) Applicant: QUALCOMM Incorporated, San Diego, CA (US)

(72) Inventors: Jing Sun, San Diego, CA (US); Yang Yang, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/022,136

(22) Filed: Jun. 28, 2018

(65) Prior Publication Data

US 2019/0007163 A1  Jan. 3, 2019

Related U.S. Application Data

(60) Provisional application No. 62/527,014, filed on Jun. 29, 2017.

(51) Int. Cl.
| | |
|---|---|
| *H04W 4/00* | (2018.01) |
| *H04L 1/00* | (2006.01) |
| *H04L 5/00* | (2006.01) |
| *H04W 72/04* | (2009.01) |
| *H04L 1/18* | (2006.01) |

(52) U.S. Cl.
CPC .......... *H04L 1/0013* (2013.01); *H04L 1/0067* (2013.01); *H04L 5/0044* (2013.01); *H04L 5/0048* (2013.01); *H04L 5/0053* (2013.01); *H04W 72/042* (2013.01); *H04L 1/1812* (2013.01)

(58) Field of Classification Search
CPC ... H04L 1/0013; H04L 1/1812; H04L 5/0044; H04L 5/0048; H04L 5/0053; H04W 72/042
See application file for complete search history.

(56) References Cited

U.S. PATENT DOCUMENTS

| | | | | |
|---|---|---|---|---|
| 2018/0279135 A1* | 9/2018 | Hwang | ................. | H04L 1/1861 |
| 2018/0324688 A1* | 11/2018 | Li | ......................... | H04W 48/16 |
| 2018/0376511 A1* | 12/2018 | Tsai | .................. | H04W 74/0833 |
| 2019/0268208 A1* | 8/2019 | Seo | ..................... | H04L 25/0238 |

(Continued)

OTHER PUBLICATIONS

International Search Report and Written Opinion—PCT/US2018/040235—ISA/EPO—dated Sep. 20, 2018.

(Continued)

*Primary Examiner* — Minh Trang T Nguyen
(74) *Attorney, Agent, or Firm* — Patterson + Sheridan, LLP

(57) ABSTRACT

A method and apparatus for determining rate matching behavior for a plurality of control resource sets (CORESETs) is provided. A base station (BS) bundles a plurality of CORESETs into a global resource set. The BS configures the global resource set for a User Equipment (UE). The BS determines resources assigned to a downlink data channel overlap at least a portion of the global resource set and determines whether data on the downlink data channel is to be rate matched around the global resource set or is to use resources in the global resource set. The BS transmits the data on the downlink data channel based on the determination of the rate matching.

22 Claims, 11 Drawing Sheets

(56) References Cited

U.S. PATENT DOCUMENTS

2019/0357185 A1* 11/2019 Kwak ................ H04W 72/042

OTHER PUBLICATIONS

NTT DoCoMo, et al., "Resource Sharing Between Data and Control Channels", 3GPP Draft; R1-1711093, Jun. 26, 2017, pp. 1-7, XP051300293, Retrieved from the Internet: URL: http://www.3gpp.org/ftp/Meetings_3GPP_SYNC/RAN1/Docs/ [retrieved on Jun. 26, 2017].
Samsung: "Multiplexing NR-PDCCH and POSCH", 3GPP Draft; R1-1710696, Jun. 26, 2017 (Jun. 26, 2017), pp. 1-6, XP051299902, Retrieved from the Internet: URL: http://www.3gpp.org/ftp/Meetings_3GPP_SYNC/RAN1/Docs/ [retrieved on Jun. 26, 2017].

* cited by examiner

US 10,805,039 B2

RATE MATCHING BEHAVIOR FOR BUNDLED CORESETS

This application claims priority to U.S. Provisional Application Ser. No. 62/527,014, entitled "BUNDLED CORESET INDICATION", filed on Jun. 29, 2017, which is expressly incorporated by reference in its entirety.

TECHNICAL FIELD

The technology discussed below relates generally to wireless communication systems, and more particularly, to control resource reuse for transmitting payload data in wireless communication.

INTRODUCTION

New Radio (NR) is part of the next generation 5G mobile broadband network. 5G NR may provide increased performance in wireless broadband communication with lower cost-per-bit as compared to the current 3G and/or 4G technology. 5G NR may enable a higher level of latency, reliability, and security, and can be scaled to efficiently connect a large number of wireless devices such as Internet of Things (IoT) devices. While 5G NR may provide significantly wider bandwidth and capacity than current networks, not all network devices may need or be capable of supporting or utilizing the full bandwidth available for wireless communication.

As the demand for mobile broadband access continues to increase, research and development continue to advance wireless communication technologies not only to meet the growing demand for mobile broadband access, but to advance and enhance the user experience with mobile communications.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a Base Station (BS). The method generally includes bundling a plurality of control resource sets (CORESETs) into a global resource set; configuring the global resource set for a User Equipment (UE); determining resources assigned to a downlink data channel overlap at least a portion of the global resource set; determining whether data on the downlink data channel is to be rate matched around the global resource set or use resources in the global resource set; and transmitting the data on the downlink data channel based on the determination of the rate matching.

Certain aspects of the present disclosure provide a method for wireless communication by a User Equipment (UE). The method generally includes receiving configuration information relating to a global resource set including a plurality of bundled control resource sets (CORESETs); determining resources assigned to a downlink data channel overlap at least a portion of the global resource set; determining whether data on the downlink data channel is rate matched around the global resource set or uses resources in the global resource set; and receiving the data on the downlink data channel based on the determination of the rate matching.

Certain aspects of the present disclosure provide an apparatus for wireless communication by a Base Station (BS). The apparatus generally includes means for bundling a plurality of control resource sets (CORESETs) into a global resource set; means for configuring the global resource set for a User Equipment (UE); means for determining resources assigned to a downlink data channel overlap at least a portion of the global resource set; means for determining whether data on the downlink data channel is to be rate matched around the global resource set or use resources in the global resource set; and means for transmitting the data on the downlink data channel based on the determination of the rate matching.

Certain aspects of the present disclosure provide an apparatus for wireless communication by a User Equipment (UE). The apparatus generally includes means for receiving configuration information relating to a global resource set including a plurality of bundled control resource sets (CORESETs); means for determining resources assigned to a downlink data channel overlap at least a portion of the global resource set; means for determining whether data on the downlink data channel is rate matched around the global resource set or uses resources in the global resource set; and means for receiving the data on the downlink data channel based on the determination of the rate matching.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

5G New Radio (NR) may provide significantly more bandwidth to support wireless communication for a large number of wireless devices. However, some wireless devices may not need or be capable of utilizing the full bandwidth or available resources due to, for example, hardware or resource limitations. In some examples, a device may not utilize all of the available control resources (e.g., time and/or frequency resources) for transmitting/receiving control information. In that case, it may be possible to reuse or reallocate the unused control resources for carrying payload data.

Aspects of the present disclosure provide various methods and apparatuses configured to reuse or reallocate unused control resources (e.g., downlink (DL) control resources) for DL payload data. However, the present disclosure is not limited to the DL examples described below, the concept may be extended to reuse control resources for uplink (UL) data transmission in both frequency division duplex (FDD) and time division duplex (TDD) configurations.

Figure 1:
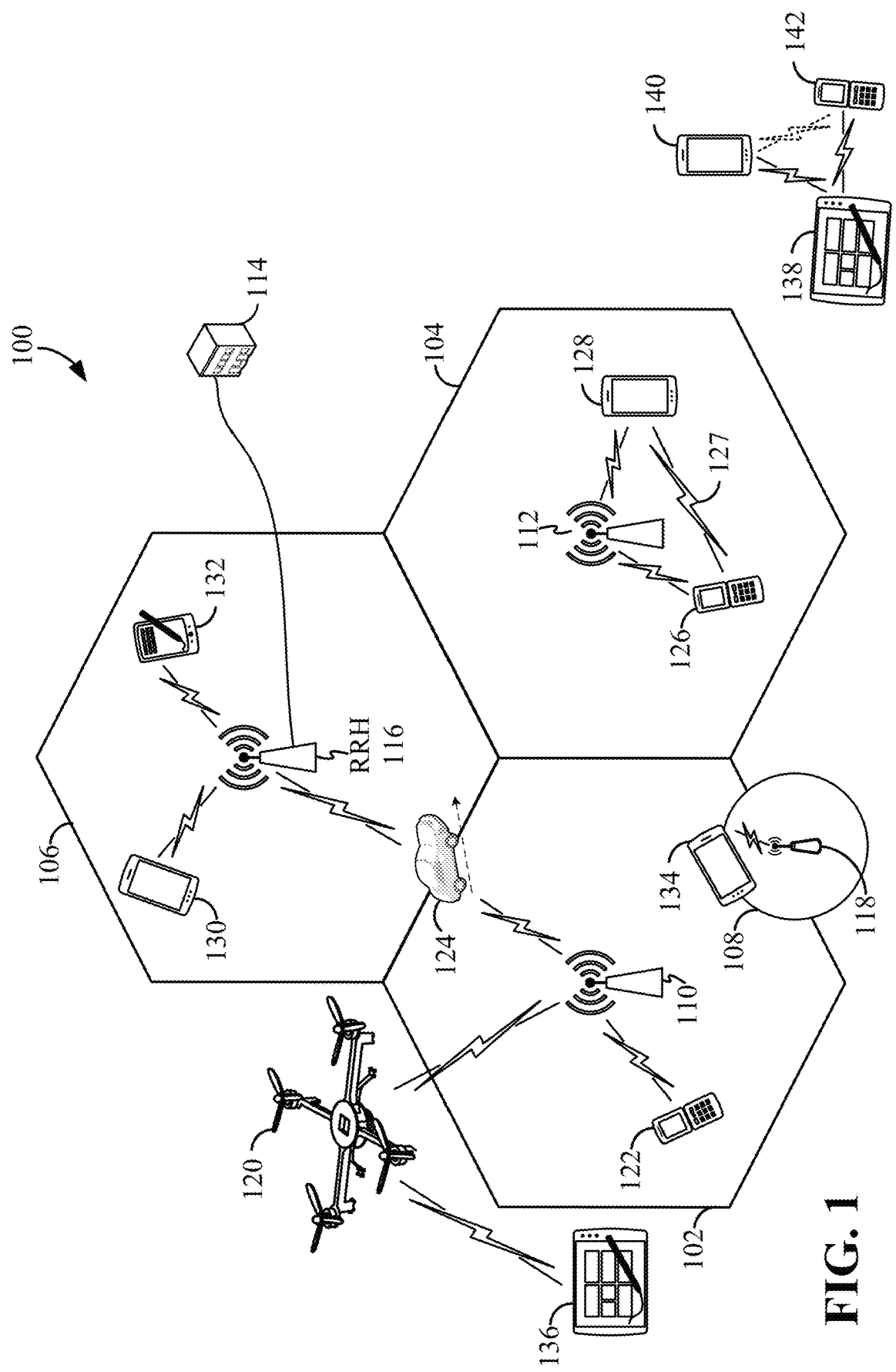
FIG. 1 is a conceptual diagram illustrating an example of a radio access network according to some aspects of the disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
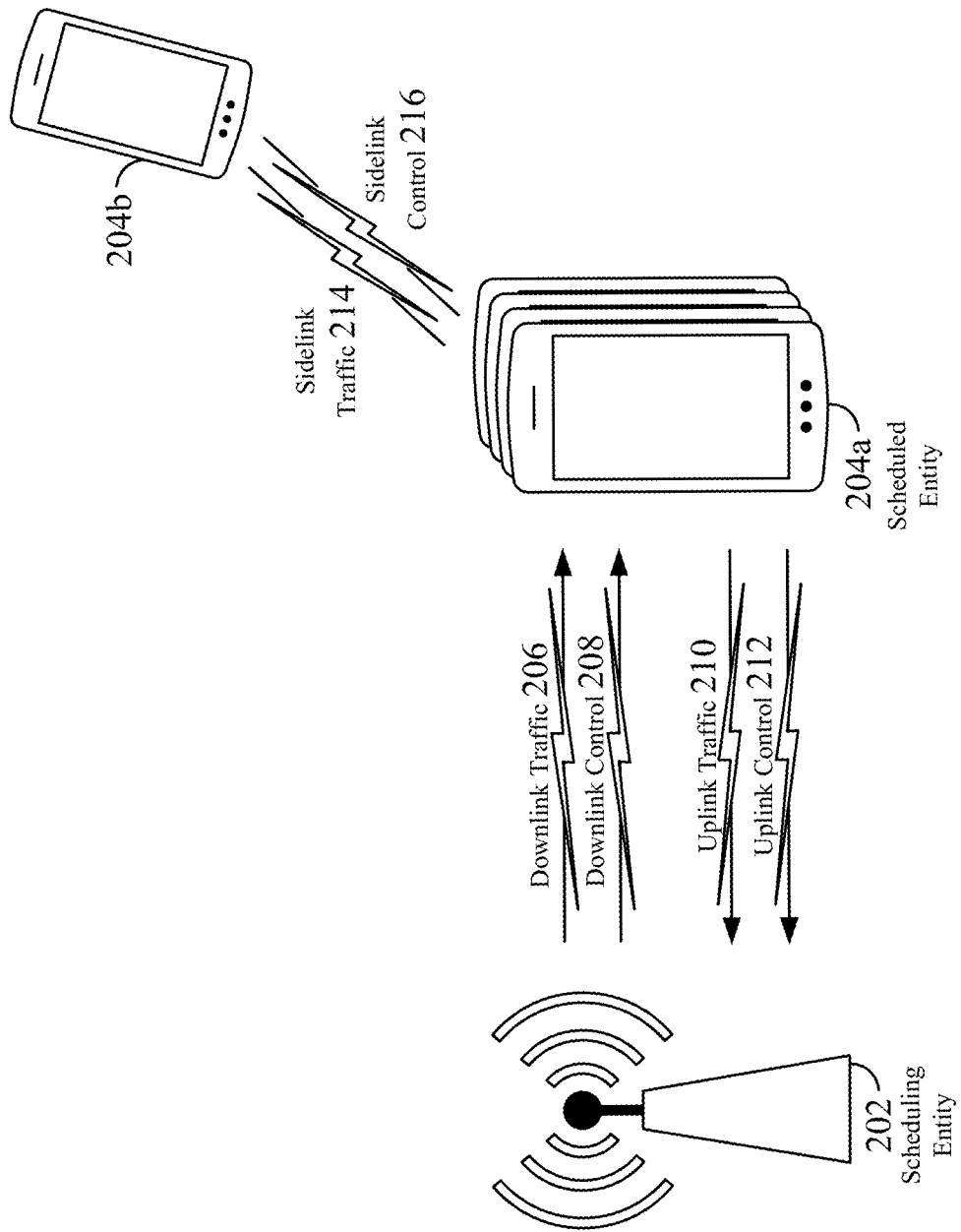
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
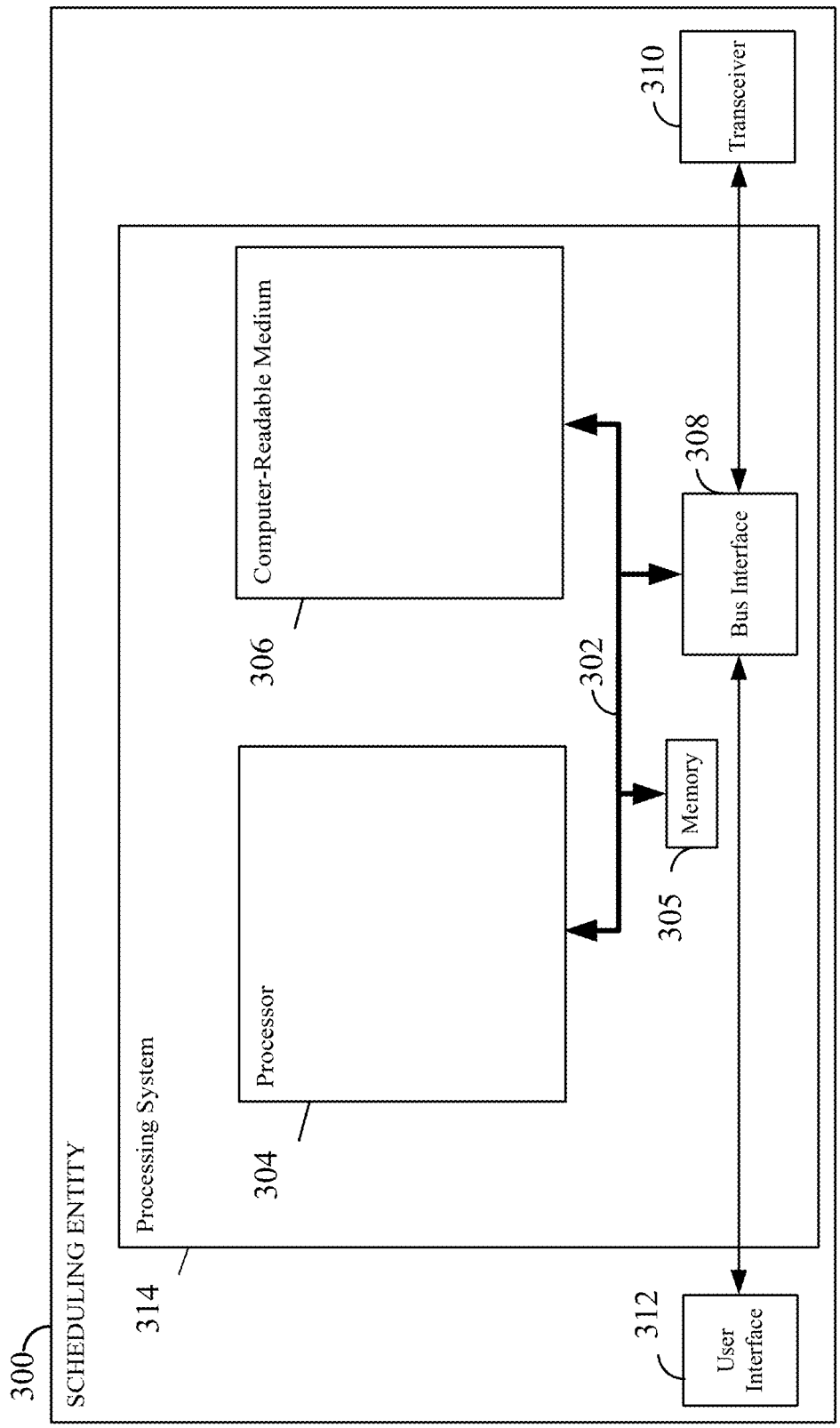
FIG. 3 is a block diagram illustrating an example of a hardware implementation for a scheduling entity employing a processing system according to some aspects of the disclosure.

FIG. 3 is a block diagram illustrating an example of a hardware implementation for a scheduling entity 300 employing a processing system 314. For example, the scheduling entity 300 may be a user equipment (UE) as illustrated in any one or more of FIGS. 1 and/or 2. In another example, the scheduling entity 300 may be a base station as illustrated in any one or more of FIGS. 1 and/or 2.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes and procedures described below and illustrated in FIGS. 5-11.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include circuitry configured to implement one or more of the functions described below in relation to FIGS. 5-11. The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EE- PROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include software configured to implement one or more of the functions described above in relation to FIGS. 5-11.

Figure 4:
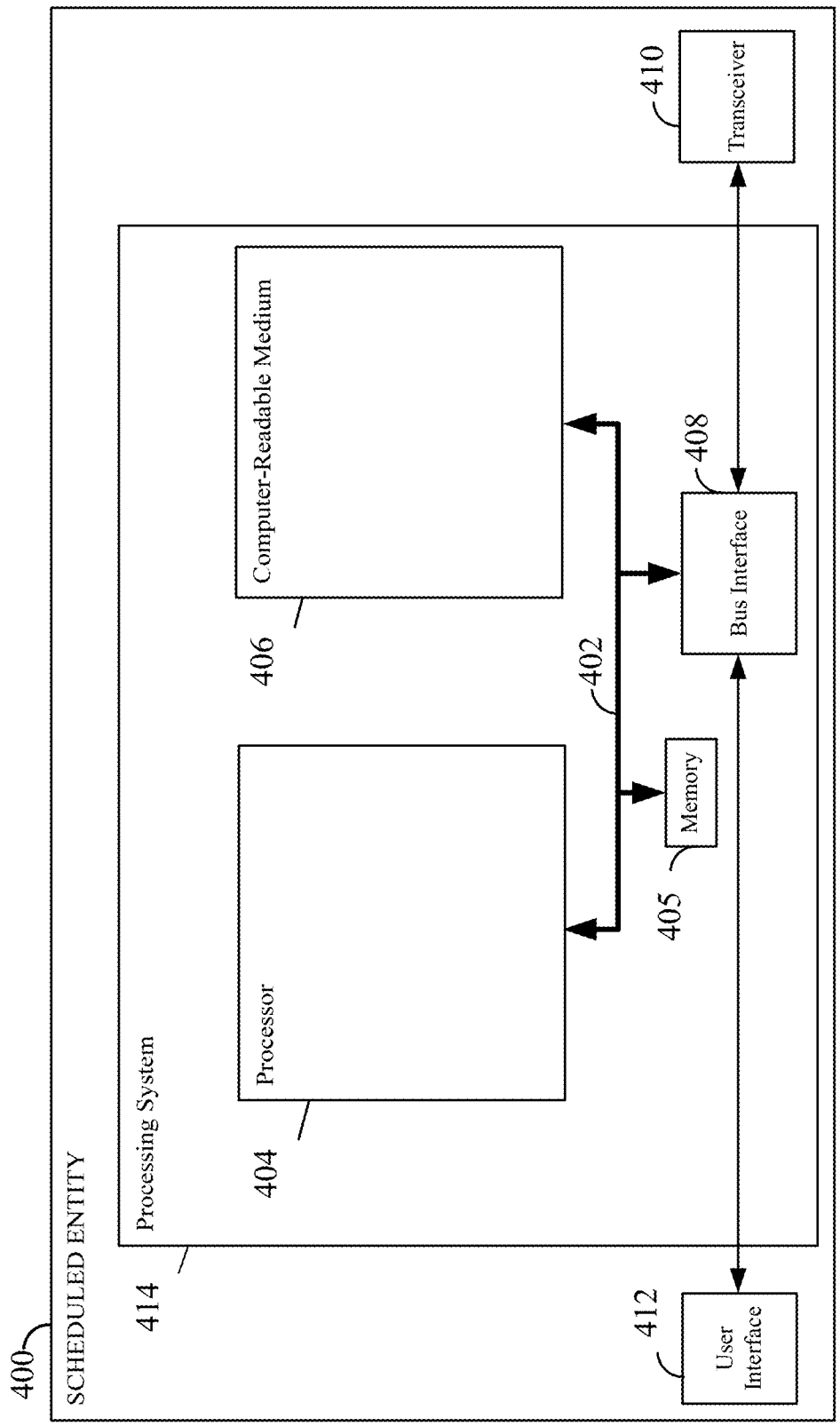
FIG. 4 is a block diagram illustrating an example of a hardware implementation for a scheduled entity employing a processing system according to some aspects of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1 and/or 2.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 substantially similar to those described above in FIG. 3. That is, the processor 404, as utilized in a scheduled entity 400, may be used to implement any one or more of the processes described below and illustrated in FIGS. 5-11.

In some aspects of the disclosure, the processor 404 may include circuitry configured to implement one or more of the functions described below in relation to FIGS. 5-11.

Figure 5:
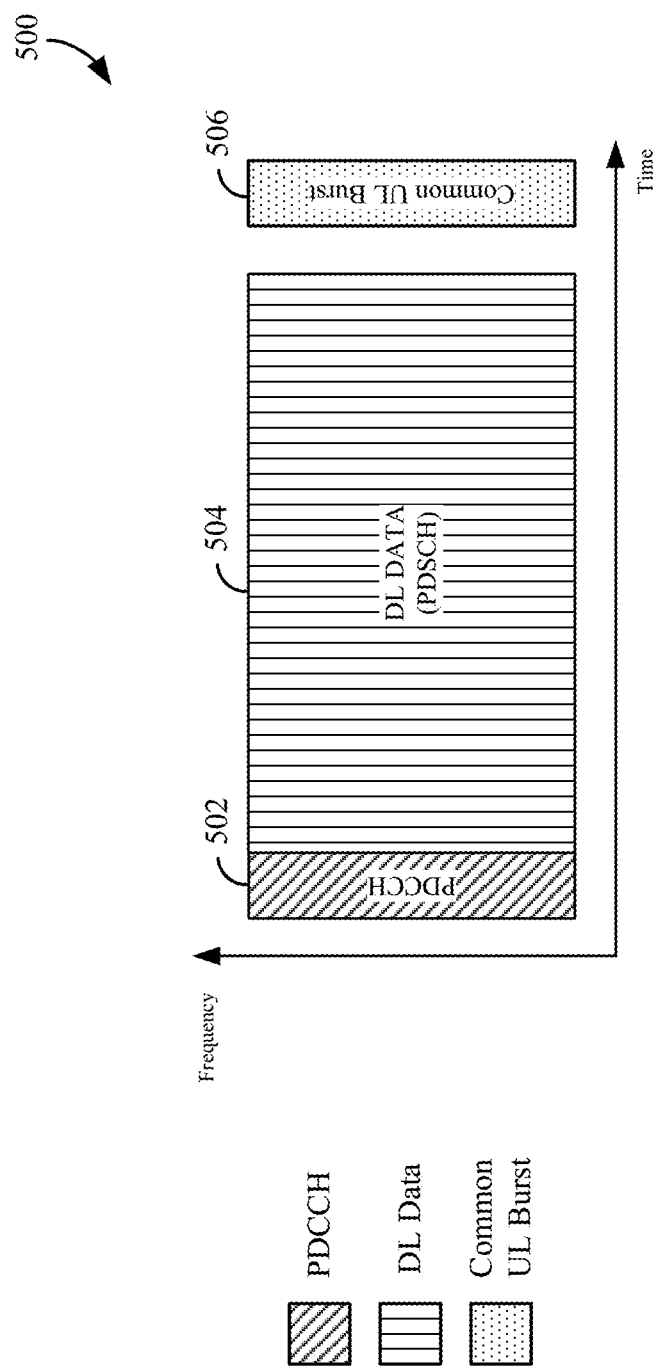
FIG. 5 is a diagram illustrating an example of a downlink centric slot according to some aspects of the disclosure.
Figure 6:
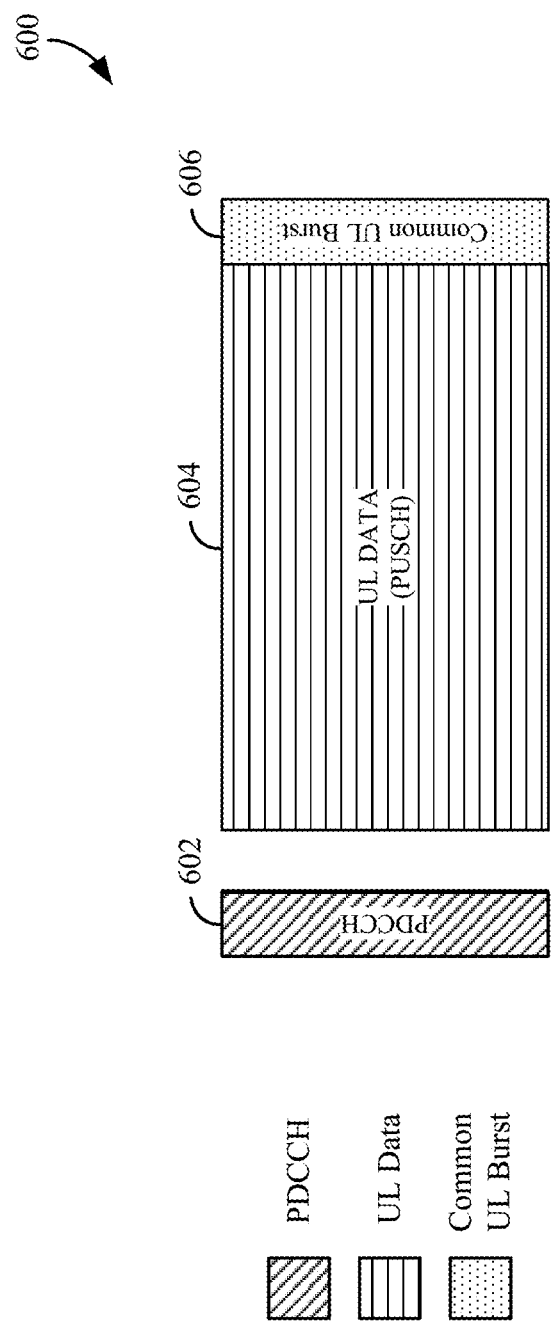
FIG. 6 is a diagram illustrating an example of an uplink centric slot according to some aspects of the disclosure.

FIGS. 5-6 are schematic diagrams that illustrate the structure of various slot formats according to a variety of aspects of this disclosure. As illustrated in FIG. 5, in each of these illustrations, the horizontal dimension represents time, and the vertical dimension represents frequency. Neither of these dimensions is intended to be accurate to scale, and are merely utilized as a scheme to illustrate characteristics of different waveforms over time as they may be configured in respective examples and embodiments. FIG. 5 is a diagram showing an example of a DL-centric slot 500. The DL-centric slot may include a control portion 502. The control portion 502 may exist in the initial or beginning portion of the DL-centric slot. The control portion 502 may include various scheduling information and/or control resources corresponding to various portions of the DL-centric slot. In some configurations, the control portion 502 may include a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from a scheduling entity 202 (e.g., eNB) to a scheduled entity 204 (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information. As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric subframe and alternative structures having similar features may exist without necessarily deviating from the aspects described herein.

FIG. 6 is a diagram showing an example of an UL-centric slot 600. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the scheduled entity 204 (e.g., UE) to the scheduling entity 202 (e.g., eNB). In some configurations, the control portion 602 may be a physical UL shared channel (PUSCH). As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)). The UL-centric slot may also include a common UL portion 606. The common UL portion 606 in FIG. 6 may be similar to the common UL portion 506 described above with reference to FIG. 5. The common UL portion 506 may include additional or alternative information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

Figure 7:
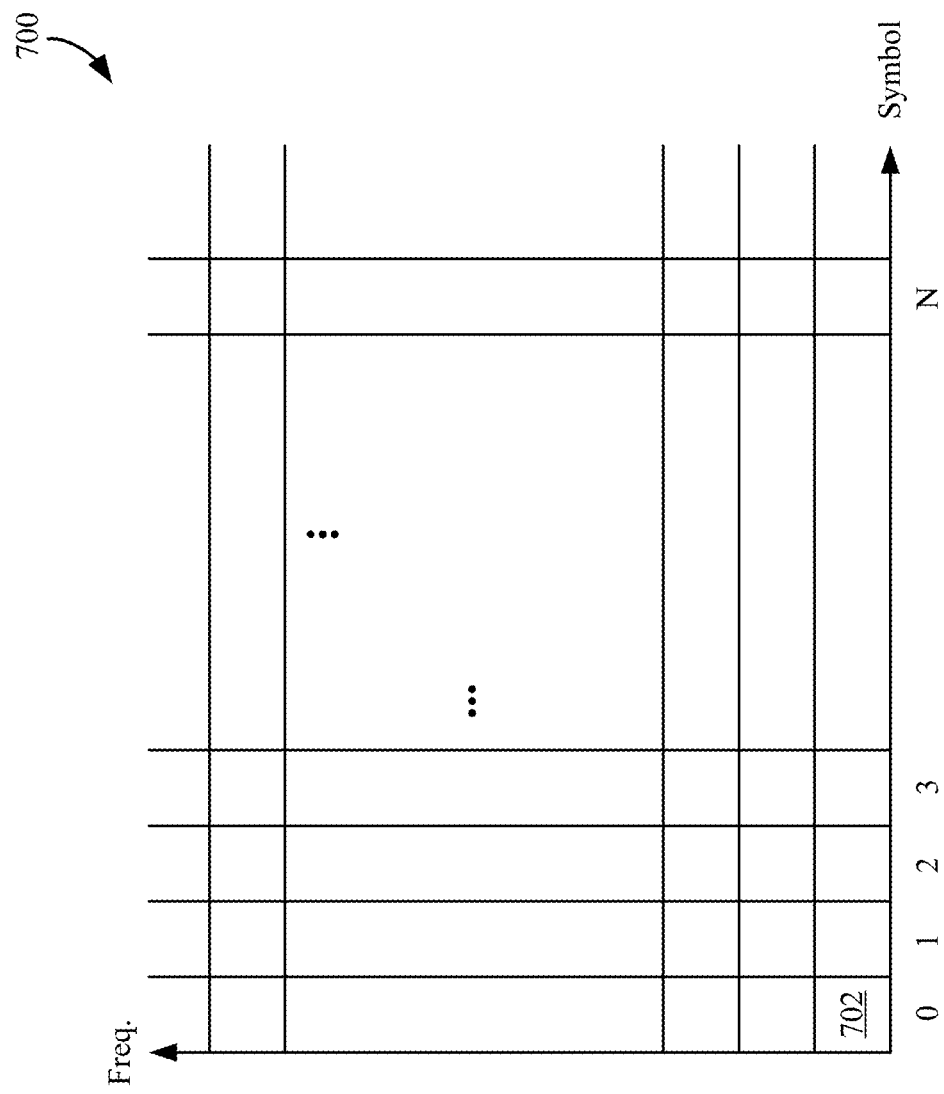
FIG. 7 is a diagram illustrating an example of a resource grid according to some aspects of the disclosure.

FIG. 7 is a diagram illustrating a resource grid 700 for wireless communication in accordance with an aspect of the disclosure. In FIG. 7, frequency increases in the vertical direction, and the horizontal direction represents symbol (OFDM symbol) timing. Each resource element 702 represents a combination of symbol time and bandwidth (e.g., carrier) that may be allocated or scheduled to transmit information or data. Some of the resource elements 702 may be grouped together to be allocated as a unit or block.

Figure 8:
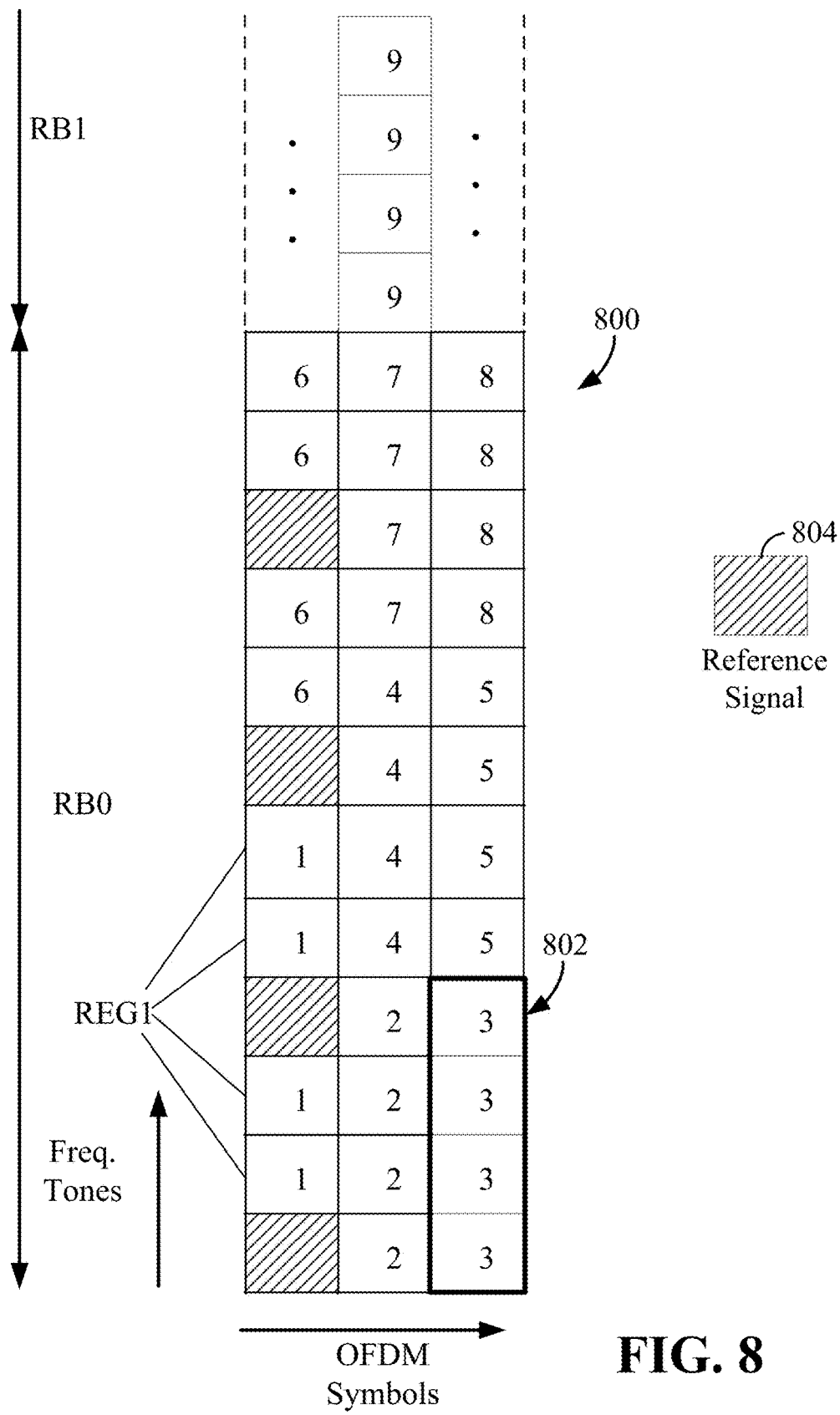
FIG. 8 is a diagram illustrating a portion of the resource grid of FIG. 7 according to some aspects of the disclosure.

FIG. 8 illustrates a portion of the resource grid 700 including a number of resource elements 800. In FIG. 8, frequency or BW extends in the vertical direction, and time extends in the horizontal direction. The frequency or BW dimension is divided into units that may be referred to as frequency tones, OFDM tones, or sub-carriers; and the time dimension is divided into units that may be symbol durations or OFDM symbols. These intersecting divisions form a grid of resource elements (REs) similar to the resource elements shown in FIG. 7. In this example, each RE may correspond to a unit of one OFDM tone and one OFDM symbol.

The resource elements corresponding to the same OFDM symbol may be grouped into resource element groups (e.g., resource element group 802). In this example, each resource element group (REG) may include four resource elements. Nine REGs each including four REs are shown in FIG. 8 (e.g., REG 1 through REG 9). In other aspects of the disclosure, an REG may have more or less resource elements in other examples. The resource elements may also be grouped into resource element groups different from those shown in FIG. 8. FIG. 8 shows four exemplary reference signals 804 distributed in the first OFDM symbol. In other examples, more or fewer reference signals may be used, and the reference signals may be located in REs different from those shown in FIG. 8.

Figure 9:
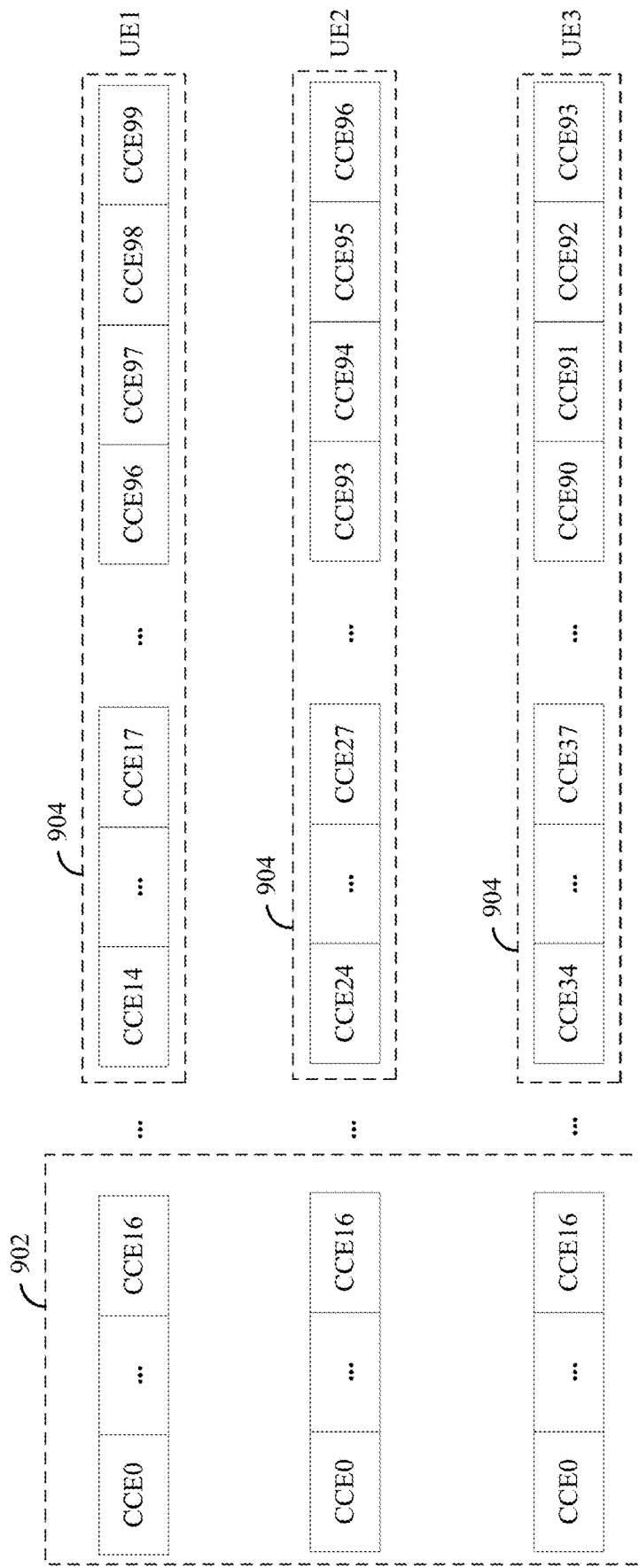
FIG. 9 is a diagram illustrating an example of various search spaces according to some aspects of the disclosure.

A number of REGs 802 may be grouped or mapped to a number of control channel elements (CCEs) that may be represented logically by their index numbers (see FIG. 9). In some examples, nine REGs may be mapped to one CCE. A PDCCH may include any number of CCEs based on different aggregation levels, and the PDCCH may carry the downlink control information (DCI) and/or other control messages. One or more CCEs may be assigned to the search space of one or more UEs or scheduled entities, and the UE can find its PDCCH in the assigned CCEs.

The number of CCEs available for carrying the PDCCH may be variable depending on the number of OFDM symbols used, the bandwidth of the system, and/or a number of antenna ports present at the scheduling entity. In some examples, consecutive CCEs may be mapped into REGs that are distributed (i.e., non-consecutive) in frequency. Consecutive CCEs may refer to CCEs that are consecutive in their numbering or ordering in the logical space. Two REGs are not consecutive when they are not adjacent to each other (i.e., separated by one or more REs). This is called distributed CCE-to-REG mapping. In some examples, consecutive CCEs are mapped to REGs that are consecutive in frequency. This is called localized CCE-to-REG mapping. For example, consecutive or adjacent REGs are not separated from each other by one or more REs.

An aggregation level (AL) of a PDCCH transmission refers to the number of CCEs utilized for the transmission. In some examples, the PDCCH may be transmitted using AL1, AL2, AL4, and/or AL8. For AL1, one CCE may be used to carry the PDCCH. For AL2, two CCEs may be used to carry the PDCCH. For AL4, four CCEs may be used to carry the PDCCH. For AL8, eight CCEs may be used to carry the PDCCH. Therefore, a higher AL can accommodate a bigger payload or more bits in the PDCCH transmission than a lower AL.

A search space (SS) refers to the resources in a slot assigned or allocated to a UE for finding its PDCCH. That is, the search space includes a set of CCEs from which the UE may find its PDCCH. There are two types of search space: the common search space (CSS) and the UE-specific search space (USS). The common search space may carry the common downlink control information (DCI) that is broadcasted to all UEs or a group of UEs, and the UE-specific search space may carry the DCI for a specific UE. Each UE may monitor a predetermined search space in a PDCCH region (e.g., control region 502 in FIG. 5) of a DL slot.

Referring to FIG. 9, different UEs (e.g., UE1, UE2, UE3) may have a same CSS 902 and different USS 904. For example, the CSS 902 may include the first sixteen CCEs (e.g., CCE0 to CCE16) that are the same for all UEs. The USS of each UE may include different CCEs from the available CCEs, and the respective USSs 904 of the UEs may overlap. That is, some CCEs may be included in multiple USS 904. For example, CCE96 is included in the USS of UE1 and UE2, and CCE93 is included in the USS of UE2 and UE3.

Because 5G NR can support a bandwidth significantly wider than current 3G/4G networks, the control resources (e.g., REs, CCEs) may be partitioned or grouped into different control resource sets. Each control resource set (CORESET) includes one more search spaces as described above. The CORESETs may be determined based on sub-bands or carriers such that a UE with a limited bandwidth can be assigned to the proper CORESET in a bandwidth that can be supported by the UE. In some examples, the control resources of a CORESET may be located in a sub-band region or a subset of carriers of the entire bandwidth supported by the scheduling entity. A CORESET may be a common CORESET (C-CORESET) or a UE-specific CORESET (U-CORESET). The scheduling entity may configure the C-CORESET for all UEs and optionally one or more U-CORESETs for different UEs. The C-CORESET may include the CSS and USS of one or more UEs, and the U-CORESET may include the USS. The CORESETs may be configured and reconfigured by using a radio resource control (RRC) configuration or other semi-static procedure. A C-CORESET may be reconfigured to other frequency, for example, when UEs with different capabilities join and/or leave the network.

In some aspects of the disclosure, some control resources of the DL control region 502 (see FIG. 5) may be reused by the DL data portion 504 for carrying DL data. This situation may occur when the DL control region has more than sufficient resources to transmit the DL control information (e.g., PDCCH) in a slot.

The resources of the DL control region may be reused or reallocated to the DL data portion in two different methods. A time-domain only method expands the DL data portion in the time domain only with respect to the PDSCH. That is, the scheduling entity can inform the UE the starting symbol position of its PDSCH in the time domain. For example, if the PDSCH originally is scheduled to start at symbol 3 of a slot, the expanded PDSCH can start at symbol 1 or 2 that is originally scheduled for the DL control portion.

In another method, the scheduling entity may inform the UE the time and frequency locations of the resources that can be reallocated to the DL data portion. This method allows the resources to be identified independent of the PDSCH. For example, in the time domain, the scheduling entity may indicate the starting symbol position only, or both starting and ending symbol positions. In the frequency domain, the scheduling entity may indicate the starting and ending frequencies or reused CCE(s) corresponding to the reallocated control resources.

When control resources are reallocated for DL data, the scheduling entity may configure the UE to rate-match the PDSCH based on various rules to utilize the additional resources. The function of rate matching is to match the number of bits in transport block (TB) or unit to the number of bits that can be transmitted in the given allocation or resources. For example, rate-matching may involve sub-block interleaving, bit collection, and pruning.

In one aspect of the disclosure, the scheduling entity can configure a UE to rate-match its PDSCH outside the CORE-SETs. In one example, the scheduling entity ensures not to configure or reallocate resource elements (REs) that overlap with the CORESET of other UEs. Then, the UE rate-matches its PDSCH around or outside the C-CORESET and its own U-CORESET. In another example, the scheduling entity informs a UE about the U-CORESETs of other UEs, then the UE can rate-match its PDSCH around or outside all the informed CORESETs.

In another aspect of the disclosure, the UE may rate-match its PDSCH outside the configured search spaces. In one example, the scheduling entity ensures not to configure or reallocate resource elements that overlap with the USS of other UEs, then the subject UE can rate-match around or outside the CSS and its own USS. In case that wideband (WB) reference signal (RS) is used for the C-CORESET, the UE may rate-match around all the WB RS in the C-CORESET. In another example, the scheduling entity may inform a UE about the USS of other UEs, then the UE can rate-match around or outside all the informed search spaces. In case WB RS is used for the C-CORESET, the UE can rate-match around all the WB RS in the C-CORESET.

In another aspect of the disclosure, the UE can rate-match its PDSCH around all the decoded PDCCHs. In one example, the scheduling entity ensures not to configure resource elements that overlap with other UE's PDCCHs. In case WB RS is used for the C-CORESET, the UE can rate-match around all the WB RS in the C-CORESET.

In some aspects of the disclosure, the scheduling entity may transmit an indicator in the DL control portion to inform a UE how the reallocated control resources are to be used in the DL data portion or PDSCH. For example, the scheduling entity may transmit an indicator to provide a predetermined or selected rule in the DCI or via RRC or other semi-static signaling. For example, this rule informs the UE how to rate-match the PDSCH to utilize the reallocated control resources. The scheduling entity may also transmit an indicator to provide a predetermined or selected resource reuse type in the DCI or via RRC or other semi-static signaling. The resource reuse type may be the same as the time-domain only expansion with respect to the PDSCH, or time and frequency domain expansion independent of the PDSCH, as described above.

In some aspects of the disclosure, the scheduling entity may configure control resource reuse with multi-slot scheduling. In one example, resource reuse types for subsequent slots can be the same as a current slot, different types per slot as specified in DCI or RRC signaling, starting from the first symbol, or no reuse. The scheduling entity may configure the UE to rate-match its PDSCH for subsequent slots based various rules. For example, rate-matching for the subsequent slots may use the same rule as the current slot, different rules per slot as specified in DCI or RRC signaling, always applying conservative rules as described above to rate-match outside the CORESETs and/or SSs.

Example Rate Matching Behavior for Bundled CORESETs

In certain aspects, resources assigned to a downlink data channel (e.g., PDSCH) may overlap (at least partially) with resources assigned to a CORESET. In this context, a gNB may decide to rate match the PDSCH around the CORESET or decide to reuse (e.g., at least partially) resources assigned to the CORESET for the PDSCH, for example, based on whether the resources assigned to the CORESET are available for reuse, and if yes to what extent. For example, if the CORESET is not assigned control transmissions or a limited portion (e.g., REs) of the CORESET is assigned for control transmissions, the gNB may decide to reuse the CORESET or an unused portion thereof for transmission of PDSCH data. Alternatively, if most or all of the CORESET is assigned for control transmission, the gNB may decide to rate match the PDSCH around the CORESET by assigning PDSCH data to resources around the CORESET and not reusing the CORESET for PDSCH data.

In certain aspects, according to current 3GPP standards, the gNB generally indicates the rate matching behavior including whether or not the PDSCH data is rate matched around a particular CORESET by including an indication of the rate matching behavior as part of the DCI transmitted in the PDCCH. In an aspect, this indication generally includes a one bit indication of whether or not the CORESET is reused for PDSCH data, i.e., whether or not the PDSCH data is rate matched around the CORESET.

However, in certain aspects, multiple CORESETs may be configured for a UE (e.g., via multiple user specific search spaces (USS) and/or multiple common search spaces (CSS)). These CORESETs may include CORESETs assigned to one or more other UEs. In this context, a separate one bit indicator may be needed to indicate the rate matching behavior for each CORESET. Further, the UE may need to be provided information regarding resource assignment for each CORESET (e.g., via RRC signaling) to enable the UE to identify a particular CORESET and determine rate matching behavior for the particular CORESET. This may significantly increase system overhead.

Aspects of the present disclosure describe techniques for defining rate matching behavior associated with a plurality of CORESETs configured for a UE, without substantially increasing resource overhead.

In certain aspects, multiple CORESETs are bundled into a global resource set. The UE is configured with the global resource set (e.g., via RRC signaling). In an aspect, the UE is not conveyed information regarding resource assignment for the individual CORESETs, and configured with the total resource assignment of the global resource set. Additionally or alternatively, instead of using a separate bit to indicate a rate matching behavior for each CORESET, a single one bit indication (e.g., in DCI) is used to indicate the rate matching behavior associated with the global resource set. In an aspect, the single bit indicates whether the gNB has rate matched the PDSCH data around the global resource set or has used resources (e.g., REs) of the global resource set for scheduling at least a portion of the PDSCH data.

In certain aspects, not conveying resource assignment for individual CORESETs to a UE and/or using a single DCI bit to provide rate matching information for the global resource set including multiple CORESETs reduces system overhead and increases system efficiency.

In an aspect, the UE may be configured with resource assignments of individual CORESETS in the global resource set, while still using a single DCI bit to convey the rate matching behavior for the global resource set.

In an aspect, the global resource set, in addition to including one or more bundled CORESETs, may include additional resources for other signaling which is out of the scope of this disclosure. However, the global resource set at least includes resources assigned to one or more CORESETS configured for one or more UEs. In an aspect, the global resource set only includes resources configured for one or more CORESETs and no additional resources. In an aspect, the bundled CORESETs do not have to be assigned consecutive time and/or frequency resources within the global resource set. Each of the bundled CORESETs may be assigned to different non-consecutive (e.g., in time or frequency domain) portions of the global resource set.

Figure 10:
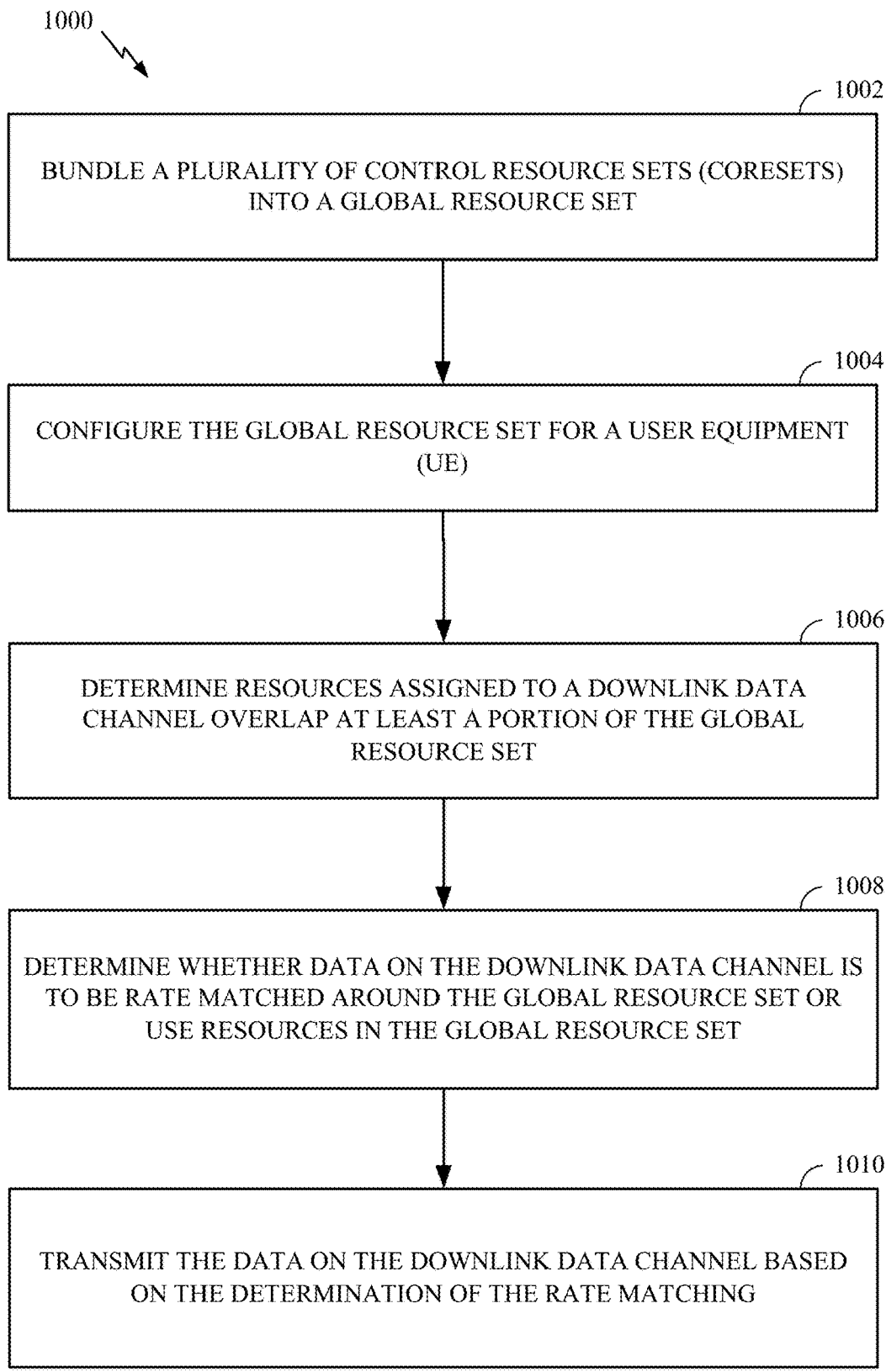
FIG. 10 illustrates example operations 1000 performed by a Base Station (e.g., gNB) for determining a rate matching behavior for a plurality of CORESETs, in accordance with certain aspects of the present disclosure.

FIG. 10 illustrates example operations 1000 performed by a Base Station (e.g., gNB) for determining a rate matching behavior for a plurality of CORESETs, in accordance with certain aspects of the present disclosure.

Operations 1000 begin, at 1002 by bundling a plurality of CORESETs into a global resource set. At 1004, the BS configures the global resource set for a UE (e.g., via RRC signaling). At 1006, the BS determines resources assigned to a downlink data channel (e.g., PDSCH) overlap at least a portion of the global resource set. At 1008, the BS determines whether the data on the downlink data channel is to be rate matched around the global resource set or is to use resource in the global resource set. At 1010, the BS transmits the data on the downlink data channel based on the determination of the rate matching behavior.

Figure 11:
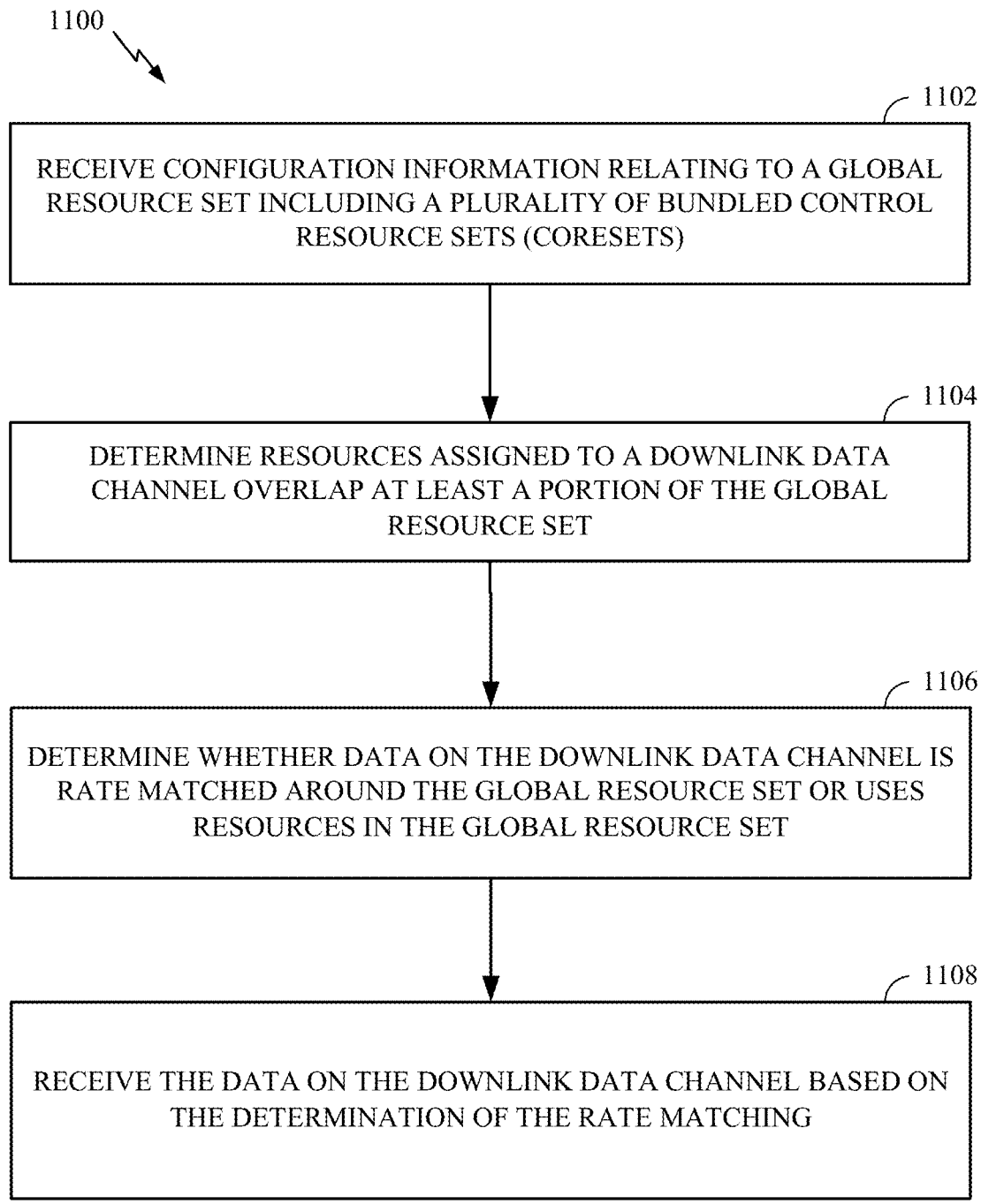
FIG. 11 illustrates example operations 1100 performed by a UE for determining a rate matching behavior for a plurality of CORESETs, in accordance with certain aspects of the present disclosure.

FIG. 11 illustrates example operations 1100 performed by a UE for determining a rate matching behavior for a plurality of CORESETs, in accordance with certain aspects of the present disclosure.

Operations 1100 begin, at 1102, by receiving configuration information (e.g., via RRC signaling from the gNB) relating to a global resource set including a plurality of bundled CORESETs. At 1104, the UE determines resources assigned to a downlink data channel (e.g., PDSCH) overlap at least a portion of the global resource set.

At 1006, the UE determines whether data on the downlink data channel is rate matched around the global resource set or uses resources in the global resource set. In an aspect, this determination may be based on a semi-static configuration (e.g., via RRC signaling) or an explicit dynamic indication (e.g., DCI signaling) from the gNB.

At 1008, the UE receives the data on the downlink data channel based on the determination of the rate matching. For example, if the UE determines that the PDSCH data is rate matched around the global resource set, the UE does not process the global resource set for receiving the PDSCH data. On the other hand, if the UE determines that the at least a portion of the PDSCH data is scheduled on resources of the resource set, the UE processes the resource set or a portion thereof to receive the PDSCH data.

In an aspect, the gNB configures the UE (e.g., via RRC signaling) with resources assigned for the global resource set. The configuring does not including conveying to the UE information relating to resources assigned to individual CORESETs bundled into the global resource set. As noted above this reduces system overhead.

In an aspect, the plurality of CORESETs bundled into the global resource set includes one or more CORESETs assigned to a different UE. Additionally or alternatively, the plurality of CORESETs includes at least one CORESET assigned to the UE but temporarily unusable by the UE for the control channel monitoring. For example, a CORESET configured for the UE may not be used in an active bandwidth part.

In an aspect, the gNB transmits an indication of whether the PDSCH data is rate matched around the global resource set or uses resources in the global resources. That is, the indication indicates to the UE if the resources of the global resources set are available for scheduling PDSCH data or not. The UE decides, based on this indication, whether or not to monitor the global resource set for the PDSCH data. For example, if the indication indicates that the PDSCH data is rate matched around the global resource set, the UE does not process the global resource set for the PDSCH data. On the other hand, if the indication indicates that the PDSCH data uses at least a portion of the resources assigned to the global resource set, the UE processes the global resource set to receive the PDSCH data.

In an aspect, the indication includes a one bit indication of whether or not the PDSCH is rate matched around the global resource set. For example, '0' indicates that the PDSCH data is rate matched around the global resource set and '1' indicates reusing at least a portion of the resources of the global resource set for the PDSCH. Alternatively, '1' may indicate rate matching around the global resource set and '0' may indicate reusing the global resource set for PDSCH.

In an aspect, the indication is transmitted by the gNB as part of DCI in the PDCCH.

In certain aspects, when configuring the global resource set, the gNB may block out a set of resources within the global resource set from being reused for data transmission (e.g., PDSCH data). Thus, even if the gNB decides to reuse the global resource set for PDSCH, an exception to the reuse may be defined so that the blocked out resources of the global resource set may not be reused for transmitting PDSCH data. For example, if the PDCCH, transmitted as part of the UE's CORESET within the global resource set, includes the one bit indicator of the rate matching behavior for reuse, the PDSCH may be rate matched around the resources (e.g., REs) assigned to the PDCCH, while still reusing other portions of the global resource set for the PDSCH. This ensures that the UE receives the indication of the rate matching behavior and receives the PDSCH data based on the received indication. In an aspect, the PDCCH includes a Group Common PDCCH (GC-PDCCH).

In an aspect, when the PDSCH is configured to reuse resources of the global resource set, the gNB avoids assigning those resources to the PDSCH that are assigned for the PDCCH (e.g., GC-PDCCH). In this context, the UE does not process the PDCCH resources for the PDSCH.

In certain aspects, since the detailed resource information regarding each component CORESET in a global resource set is not transmitted to the UE, it may be hard to block out particular resources assigned within the global resource set.

In an aspect, the PDCCH (e.g., GC-PDCCH) may always be scheduled at a fixed resource location within the global resource set, for example, first few symbols of the global resource set. Thus, the UE knows to not monitor for the PDSCH in these resources.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for wireless communication by a base station (BS), comprising:
   bundling a plurality of control resource sets (CORESETs) into a global resource set;
   configuring the global resource set for a user equipment (UE);
   determining resources assigned to a downlink data channel overlap at least a portion of the global resource set;
   determining whether data on the downlink data channel is to be rate matched around the global resource set or uses resources in the global resource set;
   transmitting the data on the downlink data channel based on the determination of whether the data on the downlink data channel is to be rate matched around the global resource set or uses resources in the global resource set; and
   transmitting a one-bit indication of whether the data on the downlink data channel is rate matched around the global resource set or uses resources in the global resource set.

2. The method of claim 1, wherein the configuring comprises transmitting, to the UE, information relating to the resources assigned to the global resource set.

3. The method of claim 2, wherein the configuring does not comprise transmitting information relating to resources assigned to individual CORESETs from the plurality of CORESETs.

4. The method of claim 1, wherein the indication is transmitted as part of Downlink Control Information in a Physical Downlink Control Channel (PDCCH).

5. The method of claim 4, wherein the downlink data channel is configured to use the resources in the global resource set, and further comprising avoiding assigning resources to the downlink data channel that are assigned to the PDCCH.

6. The method of claim 4, wherein the PDCCH comprises a Group Common PDCCH (GC-PDCCH).

7. The method of claim 1, wherein the plurality of CORESETs includes at least one CORESET assigned to a different UE or temporarily unusable by the UE.

8. The method of claim 1, wherein the downlink data channel comprises a Physical Downlink Shared Channel (PDSCH).

9. A method for wireless communication by a user equipment (UE), comprising:
   receiving configuration information relating to a global resource set including a plurality of bundled control resource sets (CORESETs);
   determining resources assigned to a downlink data channel overlap at least a portion of the global resource set;
   determining whether data on the downlink data channel is rate matched around the global resource set or uses resources in the global resource set;
   receiving the data on the downlink data channel based on the determination of whether the data on the downlink data channel is rate matched around the global resource set or uses resources in the global resource set; and receiving a one-bit indication of whether the data on the downlink data channel is rate matched around the global resource set or uses resources in the global resource set.

10. The method of claim 9, wherein the configuration comprises information relating to the resources assigned to the global resource set.

11. The method of claim 10, wherein the configuration does not comprise information relating to resources assigned to individual CORESETS from the bundled CORESETs.

12. The method of claim 9, wherein the indication is received as part of Downlink Control Information in a Physical Downlink Control Channel (PDCCH).

13. The method of claim 12, wherein the indication indicates that the downlink data channel is configured to use the resources in the global resource set, and further comprising not monitoring resources assigned to the PDCCH for receiving the data on the downlink data channel.

14. The method of claim 12, wherein the PDCCH comprises a Group Common PDCCH (GC-PDCCH).

15. The method of claim 9, wherein the bundled CORESETs comprises at least one CORESET assigned to a different UE or temporarily unusable by the UE.

16. The method of claim 9, wherein the downlink data channel comprises a Physical Downlink Shared Channel (PDSCH).

17. An apparatus for wireless communication by a base station (BS), comprising:
   means for bundling a plurality of control resource sets (CORESETs) into a global resource set;
   means for configuring the global resource set for a user equipment (UE);
   means for determining resources assigned to a downlink data channel overlap at least a portion of the global resource set;
   means for determining whether data on the downlink data channel is to be rate matched around the global resource set or uses resources in the global resource set;
   means for transmitting the data on the downlink data channel based on the determination of whether the data on the downlink data channel is to be rate matched around the global resource set or use resources in the global resource set; and
   means for transmitting a one-bit indication of whether the data on the downlink data channel is rate matched around the global resource set or uses resources in the global resource set.

18. The apparatus of claim 17, wherein the means for configuring is configured to transmit, to the UE, information relating to the resources assigned to the global resource set.

19. The apparatus of claim 18, wherein the means for configuring does not transmit information relating to resources assigned to individual CORESETs from the plurality of CORESETs.

20. An apparatus for wireless communication by a user equipment (UE), comprising:
   means for receiving configuration information relating to a global resource set including a plurality of bundled control resource sets (CORESETs);
   means for determining resources assigned to a downlink data channel overlap at least a portion of the global resource set;
   means for determining whether data on the downlink data channel is rate matched around the global resource set or uses resources in the global resource set;
   means for receiving the data on the downlink data channel based on the determination of whether the data on the downlink data channel is rate matched around the global resource set or uses resources in the global resource set; and
   means for receiving a one-bit indication of whether the data on the downlink data channel is rate matched around the global resource set or uses resources in the global resource set.

21. The apparatus of claim 20, wherein the configuration comprises information relating to the resources assigned to the global resource set.

22. The apparatus of claim 21, wherein the configuration does not comprise information relating to resources assigned to individual CORESETS from the bundled CORESETs.

* * * * *